(12) United States Patent
Zotz

(10) Patent No.: US 10,066,668 B2
(45) Date of Patent: Sep. 4, 2018

(54) SPLIT INNER RING

(71) Applicant: MTU Aero Engines AG, Munich (DE)

(72) Inventor: Georg Zotz, Haimhausen (DE)

(73) Assignee: MTU AERO ENGINES AG, Munich (DE)

( * ) Notice: Subject to any disclaimer, the term of this patent is extended or adjusted under 35 U.S.C. 154(b) by 1011 days.

(21) Appl. No.: 14/278,151

(22) Filed: May 15, 2014

(65) Prior Publication Data

US 2014/0348449 A1    Nov. 27, 2014

(30) Foreign Application Priority Data

May 22, 2013  (EP) ..................................... 13168669

(51) Int. Cl.
| | |
|---|---|
| *F16C 33/04* | (2006.01) |
| *F01D 9/04* | (2006.01) |
| *F01D 17/16* | (2006.01) |
| *F16C 43/02* | (2006.01) |

(52) U.S. Cl.
CPC ............ *F16C 33/046* (2013.01); *F01D 9/042* (2013.01); *F01D 17/162* (2013.01); *F16C 43/02* (2013.01); *Y10T 29/49668* (2015.01)

(58) Field of Classification Search
CPC ...... F01D 17/162; F01D 9/042; F16C 33/046; F16C 43/02; Y10T 29/49668; F04D 29/563

USPC ....................................... 415/160, 190, 199.1
See application file for complete search history.

(56) References Cited

U.S. PATENT DOCUMENTS

| | | | |
|---|---|---|---|
| 5,062,767 A | | 11/1991 | Worley et al. |
| 5,277,544 A | * | 1/1994 | Naudet .................. F04D 29/563 415/160 |
| 2010/0232952 A1 | * | 9/2010 | Stiehler .................... F01D 9/042 415/199.1 |

FOREIGN PATENT DOCUMENTS

| | | |
|---|---|---|
| DE | 102006024085 A1 | 11/2007 |
| DE | 102008032661 A1 | 1/2010 |
| EP | 0259221 A1 | 3/1988 |

* cited by examiner

*Primary Examiner* — Mark Laurenzi
*Assistant Examiner* — Paul Thiede
(74) *Attorney, Agent, or Firm* — Barlow, Josephs & Holmes, Ltd.

(57) ABSTRACT

The present invention provides a split inner ring for an adjustable guide blade arrangement, having a ring segment arrangement with at least two ring segments (1, 2) and a bearing bush arrangement with at least one bearing bush (5) for mounting an adjustable guide blade (4) of the guide blade arrangement, in which a ring segment and another ring segment of the ring segment arrangement can be joined together by the bearing bush arrangement.

14 Claims, 1 Drawing Sheet

SPLIT INNER RING

BACKGROUND OF THE INVENTION

Figure 1:
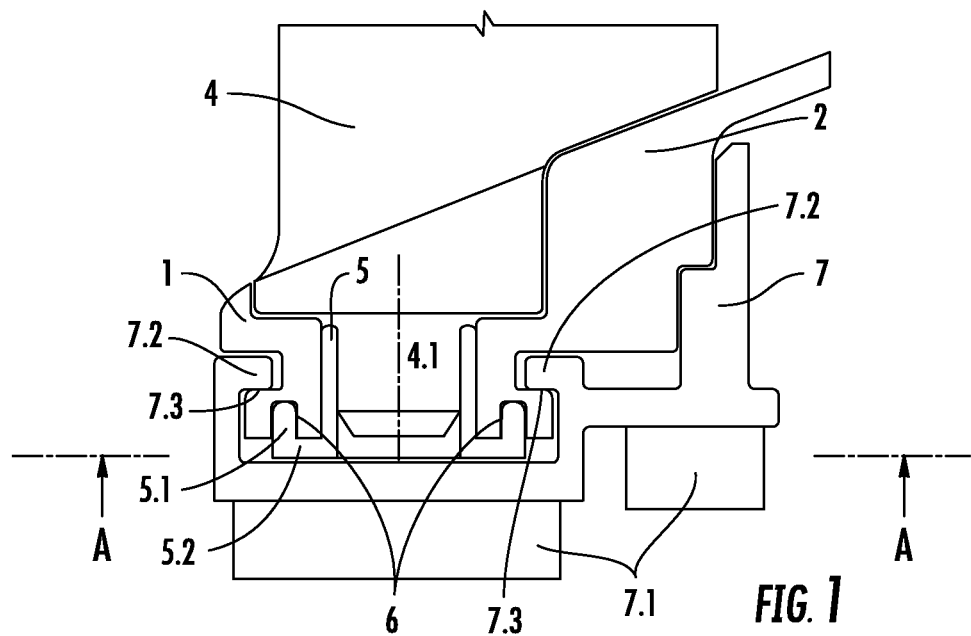

The present invention relates to a split inner ring for an adjustable guide blade arrangement of a turbomachine, a turbomachine, in particular a gas turbine, preferably an aircraft engine, having an adjustable guide blade system with such an inner ring, as well as a method for assembling such an inner ring.

Turbomachines having adjustable guide blade systems are known according to our DE 10 2006 024 085 A1, whose adjustable guide blades are mounted in an inner ring, which can be split crosswise and/or lengthwise. The ring segments of the split inner ring are screwed together or elastically braced. Subsequently, bearing bushes are introduced from radially inside into the inner ring in order to mount the guide blades.

SUMMARY OF THE INVENTION

An object of one embodiment of the present invention is to provide a turbomachine having a split inner ring.

This object is achieved by a split inner ring and method assembling a split inner ring of the present invention.

An inner ring for an adjustable guide blade arrangement of a turbomachine according to one aspect of the present invention has a ring segment arrangement with two or a plurality of ring segments.

The ring segment arrangement can be split into ring segments crosswise or perpendicular to the axis of rotation of the turbomachine and may have two or a plurality of axially adjacent ring segments, which define a separation joint with each other in the peripheral direction, and in the assembled state contact one another with axial front faces facing one another. Additionally or alternatively, the ring segment arrangement can be split into ring segments lengthwise or parallel to the axis of rotation of the turbomachine and may have two or a plurality of ring segments adjacent in the peripheral direction, which define an axial separation joint with each other, and in the assembled state contact one another with peripheral front faces facing one another. In one embodiment, the ring segment arrangement is composed of two axially adjacent ring segments, each of which extends annularly over 360° in the peripheral direction. In another embodiment, the ring segment arrangement is composed of two ring segments adjacent in the peripheral direction, each of which preferably extends over 180°. In another embodiment, the ring segment arrangement is composed of four ring segments, each of which preferably extends over 180°, whereby two ring segments are adjacent each time in the peripheral direction and form an axially anterior or posterior ring half, and whereby these two ring halves are axially adjacent. Likewise, the inner ring in the axial direction can be split into three or more disks. Additionally or alternatively, one or both ring halves or one or more ring disks is (are) composed of more than two ring segments adjacent pairwise in the peripheral direction.

According to one aspect of the present invention, the inner ring has an adjustable guide blade arrangement having one or a plurality of guide blades, which are mounted in an adjustable manner, in particular rotatable, distanced from one another in the peripheral direction, by bearing bushes of a bearing bush arrangement. In one embodiment, each of the guide blades has a radially inner journal, which is engaged in a through-hole or blind hole of a bearing bush of the bearing bush arrangement and is mounted in rotatable manner in the latter. The bearing bushes of the bearing bush arrangement can be one-part or multi-part.

According to one aspect of the present invention, at least two, but preferably all ring segments of the ring segment arrangement can be joined together or are joined together by the bearing bush arrangement. Thus, the bearing bush arrangement integrally combines two functions, i.e., the mounting of the guide blade arrangement and the joining of the ring segment arrangement. The assembling costs can be reduced thereby in one embodiment. Additionally or alternatively, the structural space can be optimized, since additional joining means such as screws or the like can be reduced in number and preferably can be dispensed with. Additionally or alternatively, a leakage through one or more separation joints of the ring segment arrangement can be reduced.

Two or a plurality of ring segments of the ring segment arrangement that are adjacent in each case can be or are locked with or to one another by the bearing bush arrangement in one embodiment of the present invention. In the present case, in particular, this is to be understood as limiting, preferably fixation, in one or two opposite directions of one or more degrees of freedom, in particular a limiting of the movement of adjacent ring segments away from one another and/or to one another in the axial and/or peripheral direction. In an enhancement, two or a plurality of ring segments of the ring segment arrangement that are adjacent in each case can be braced or are braced with one another by the bearing bush arrangement. In the present case, in particular, this is to be understood as preferably elastic pre-stressing in one or more degrees of freedom, in particular a pre-stressing of adjacent ring segments to one another in the axial and/or peripheral direction. Locking and bracing are in the present case designated as joining, generalizing for a more succinct presentation.

In one embodiment, two or a plurality of ring segments of the ring segment arrangement that are adjacent in each case can be joined or are joined with one another in form-fitting manner by the bearing bush arrangement. Additionally or alternatively, two or a plurality of ring segments of the ring segment arrangement that are adjacent in each case can be joined or are joined with one another frictionally or cohesively by the bearing bush arrangement. For this purpose, one or a plurality of bearing bushes of the bearing bush arrangement can be joined or are joined in form-fitting manner, frictionally, and/or cohesively to one or both adjacent ring segments each time.

In particular, one or a plurality of bearing bushes of the bearing bush arrangement in each case can have a radial projection, which engages behind an undercut in two adjacent ring segments of the ring segment arrangement, preferably in form-fitting manner, frictionally, and/or cohesively. In an enhancement, one or a plurality of bearing bushes of the bearing bush arrangement each may have a collar that has a preferably peripheral flange, which, in the assembled state, engages as a radial projection in a corresponding undercut in the ring segments; in one embodiment, this undercut can be formed by a preferably peripheral or continuous groove in the adjacent ring segments. In one embodiment, the bearing bushes and/or the undercut are (is) formed rotationally symmetrical. In particular, one bearing bush in an axial segment may have an L-shaped cross section, wherein the long leg can be inserted or is insertable in a corresponding borehole in the adjacent ring segments, the short leg may form the radial projection, and the collar joins the two legs together. The undercut can be formed, in particular, by an annular groove, which is formed in common by the adjacent halves of the ring segment.

In one embodiment, the undercut is disposed on a side of the ring segment arrangement that faces away from the guide blade arrangement, so that in one embodiment, the bearing bushes can be inserted from radially inside into the ring segment arrangement and thus the radial projections engage behind the undercuts. Likewise, the undercuts can be disposed on a side of the ring segment arrangement facing the guide blade arrangement, so that in one embodiment, the bearing bushes can be introduced into the ring segment arrangement from radially outside, and in this case, the radial projections engage behind the undercuts before the guide blades are subsequently mounted in the bearing bushes.

In one embodiment, a one-part or multi-part securing element, particularly a one-part or multi-part crosswise and/or lengthwise split securing element is provided for the radial fixation of the bearing bush arrangement at the ring segment arrangement. This element can be or is joined in form-fitting manner, frictionally, and/or cohesively to the ring segment arrangement. In particular, it can have at least one axial projection that engages behind an undercut in the ring segment arrangement. In an enhancement, it has at least two axial projections facing one another that engage behind the two undercuts in the ring segment arrangement disposed between the projections. In one embodiment, this undercut or these undercuts can be formed by peripheral grooves in the ring segment arrangement, the axial projections engaging in these undercuts in form-fitting manner, frictionally, and/or cohesively.

In an enhancement, the securing element can be formed as a seal carrier or an inner seal, preferably a one-part or multi-part honeycomb and/or brush seal. In this way, advantageously, two functions, i.e., the radial securing of the bearing bush arrangement and the positioning of the inner seal, can be integrated in one structural part.

In one embodiment, two or a plurality of axially adjacent ring segments of a crosswise-split ring segment arrangement can be centered or are centered in form-fitting manner relative to one another. For this purpose, in one embodiment, a ring segment can have one or a plurality of axial projections that engage in corresponding recesses in the axial front side of the adjacent ring segment. Additionally or alternatively, the securing element can center axially adjacent ring segments of the crosswise-split ring segment arrangement in form-fitting manner. For this purpose, in one embodiment, the securing element can have one or a plurality of axial projections that engage in corresponding recesses in at least one of the ring segments. Additionally or alternatively, the securing element can have one or a plurality of recesses in which engage the axial projections at least one of the ring segments.

In one embodiment, a turbomachine having one or a plurality of adjustable guide blade systems with a split inner ring as elucidated above is a gas turbine, particularly an aircraft engine, in which such a guide blade system can be disposed, particularly in one or a plurality of compressor stages and/or turbine stages.

For the assembling of a split inner ring as explained above, two or a plurality of ring segments of the ring segment arrangement are disposed axially and/or are disposed adjacent to one another in the peripheral direction, and joined by the bearing bush arrangement. In particular, at this time or subsequently, the guide blade arrangement is mounted in the bearing bush arrangement.

BRIEF DESCRIPTION OF THE DRAWING FIGURES

Figure 2:
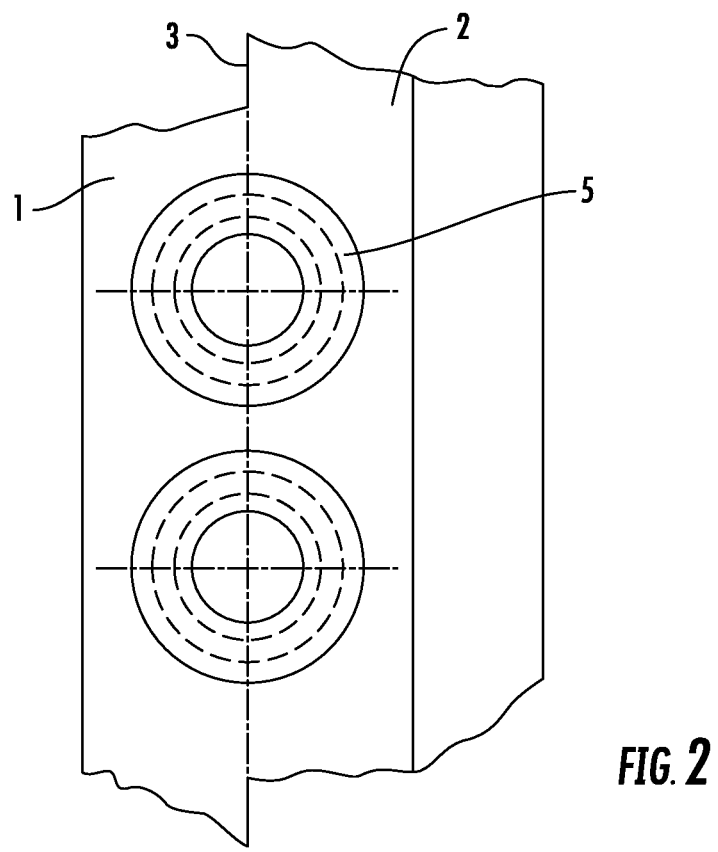

Additional advantageous enhancements of the present invention can be taken from the claims and the following description of preferred embodiments. Shown for this purpose, partially schematized:

FIG. 1 is an axial section of a portion of an inner ring of a turbomachine according to one embodiment of the present invention; and FIG. 2 is a view from radially inside according to A-A in FIG. 1 without a seal carrier.

DESCRIPTION OF THE INVENTION

FIG. 1 shows an axial section of a portion of an inner ring of a turbomachine according to one embodiment of the present invention having a crosswise-split ring segment arrangement with an axially anterior ring segment (left in FIG. 1) and a posterior ring segment axially adjacent to this (right in FIG. 2), which together define a separation joint 3 (see FIG. 2) in the peripheral direction (vertical in FIG. 2).

Adjustable guide blades 4 of a guide blade arrangement are mounted rotatably by means of journals 4.1 in throughboreholes of bearing bushes 5 of a bearing bush arrangement of the inner ring.

The axially adjacent ring segments 1, 2 are joined together in form-fitting manner by the bearing bushes 5 of the bearing bush arrangement. For this purpose, each of the bearing bushes 5 has a radial projection in the form of a flange 5.1 at a collar 5.2, which engages behind an undercut in the ring segments 1, 2, the undercut being defined by an annular groove 6. The collar 5.2 can be widened elastically in the assembled state in order to fix the bearing bushes 5 frictionally at the ring segments and to brace these.

The undercuts 6 are disposed on a side of the ring segment arrangement facing away from the guide blade arrangement (bottom in FIG. 1), in order to make possible an assembling from radially inside with simultaneous or subsequent mounting of the guide blades 4.

A multi-part securing element in the form of a crosswise-split seal carrier 7 with an inner seal 7.1 is joined in form-fitting manner to the ring segments 1, 2. For this purpose, two axial projections 7.2 of the seal carrier lying opposite one another engage in corresponding peripheral grooves in the ring segments 1, 2, which define undercuts 7.3, and thus also radially fix the bearing bush arrangement at the ring segment arrangement. The seal carrier 7 can be elastically widened radially in the assembled state, in order to pre-stress the bearing bushes 5 radially against the ring segments.

The seal carrier 7 centers the ring segments 1, 2 in form-fitting manner by projections that engage in recesses (not shown).

For the assembling of the split inner ring, the ring segments 1, 2 are joined together by inserting the bearing bushes 5. Now or subsequently, the guide blades 4 are mounted in the bearing bushes 5.

Although exemplary embodiments were explained in the preceding description, it shall be noted that a plurality of modifications is possible. In addition, it shall be noted that the exemplary embodiments are only examples that in no way shall limit the scope of protection, the applications and the construction. Rather, a guide is given to the person skilled in the art by the preceding description for implementing at least one exemplary embodiment, wherein various modifications can be carried out, in particular with respect to the function and arrangement of the described components, without leaving the scope of protection as it results from the claims and combinations of features equivalent to these.

What is claimed is:

1. A split inner ring for an adjustable guide blade arrangement in a turbomachine, comprising:
   a ring segment arrangement including a first ring segment and a second ring segment adjacent thereto;
   a bearing bush arrangement with a bearing bush configured and arranged for mounting an adjustable guide blade of the adjustable guide blade arrangement, the adjustable guide blade includes a journal received in the bearing bush of the bearing bush arrangement; the bearing bush having a radial projection in communication with the first ring segment and the second ring segment with a portion of the first ring segment and a portion of the second ring segment located between the radial projection and the journal thereby maintaining the first ring segment and the second ring segment adjacent to each other;
   the first ring segment and the second ring segment of the ring segment arrangement being joined together by the bearing bush arrangement wherein the at least one bearing bush is positioned between the journal of the adjustable guide blade and the first and second ring segments of the ring segment arrangement.

2. The split inner ring according to claim 1, wherein the first and second ring segments of the ring segment arrangement are axially adjacent and together define a separation joint in the peripheral direction and can be joined by the bearing bush arrangement.

3. The split inner ring according to claim 2, wherein a form-fitting centering of the first and second ring segments of the ring segment arrangement is provided.

4. The split inner ring according to claim 1 wherein the first and second ring segments of the ring segment arrangement are adjacent in the peripheral direction, which together define an axial separation joint and can be joined by the bearing bush arrangement.

5. The split inner ring according to claim 1, wherein the first ring segment and the second ring segment of the ring segment arrangement are connected together in form-fitting manner, frictionally, and/or cohesively by the bearing bush arrangement.

6. The split inner ring according to claim 5, wherein the radial projection of the bearing bush engages in a radial groove in the first ring segment and a radial groove in the second ring segment.

7. The split inner ring according to claim 1, further comprising:
   a securing element for the radial fixation of the bearing bush arrangement at the ring segment arrangement.

8. The split inner ring according to claim 7, wherein the securing element and the ring segment arrangement are connected together in form-fitting manner, frictionally, and/or cohesively.

9. The split inner ring according to claim 7, wherein the securing element has at least one axial projection that engages behind an undercut in the ring segment arrangement.

10. The split inner ring according to claim 7, wherein the securing element has an inner seal.

11. The split inner ring according to claim 7, wherein the securing element centers the first and second ring segments of the ring segment arrangement in form-fitting manner.

12. The split inner ring according to claim 1, wherein the split inner ring for the adjustable guide blade arrangement is configured and arranged for use in an aircraft engine.

13. The split inner ring according to claim 1, wherein the bearing bush arrangement includes a plurality of bearing bushes configured and arranged for respectively mounting a plurality of adjustable guide blades and maintaining the first ring segment and the second ring segment adjacent to one another, at a plurality of different locations, as a ring segment arrangement.

14. A method for assembling a split inner ring for an adjustable guide blade arrangement in a turbomachine, comprising the steps of:
   providing a ring segment arrangement with a first ring segment and a second ring segment adjacent thereto;
   providing a bearing bush arrangement with a bearing bush having a radial projection configured and arranged for mounting an adjustable guide blade of the adjustable guide blade arrangement, the adjustable guide blade including a journal received in the bearing bush of the bearing bush arrangement; and
   placing the radial projection in communication with a portion of the first ring segment and the second ring segment with a portion of the first ring segment and a portion of the second ring segment located between the radial projection and the journal thereby maintaining the first ring segment and the second ring segment adjacent to one another;
   joining the first ring segment and the second ring segment together by the bearing bush arrangement for mounting the adjustable guide blade arrangement wherein the at least one bearing bush is positioned between the journal of the adjustable guide blade and the first and second ring segment of the ring segment arrangement.

* * * * *